United States Patent Office 3,331,365
Patented July 18, 1967

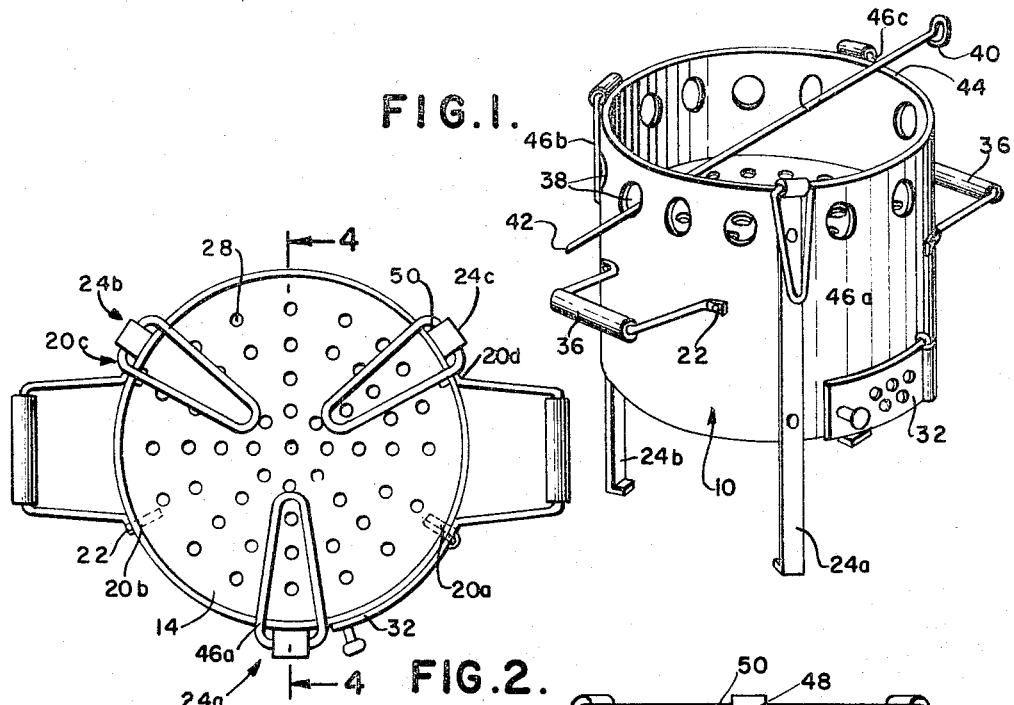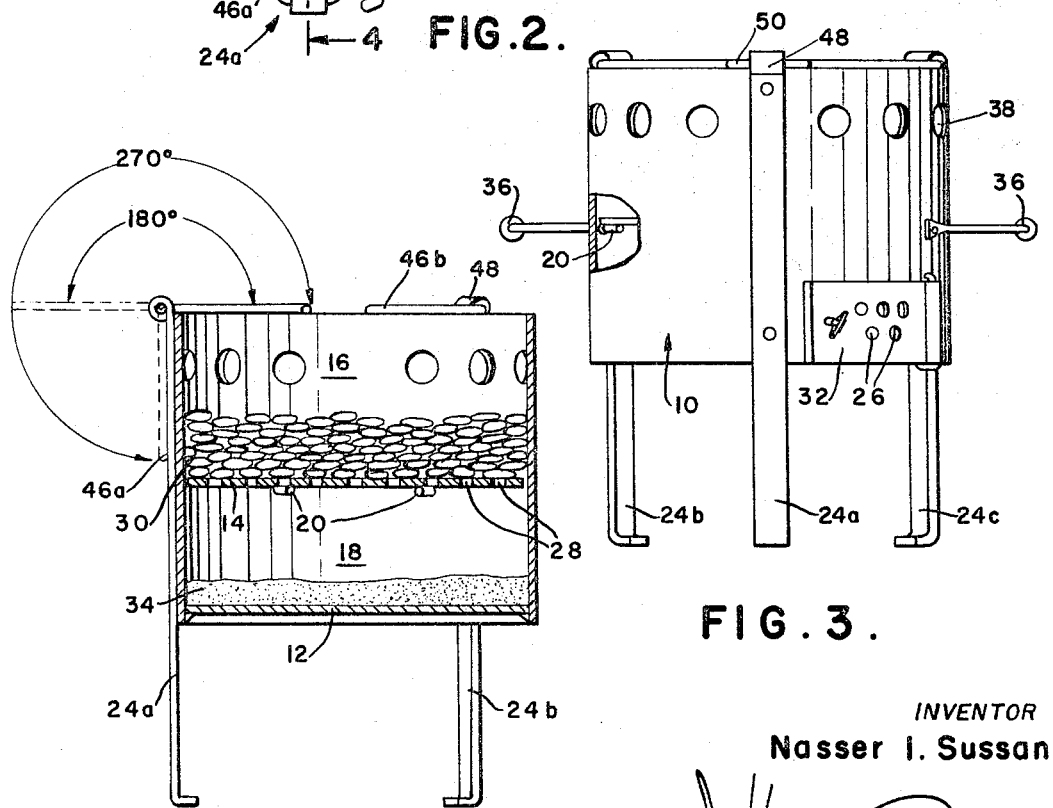

3,331,365
PORTABLE COOKER
Nasser I. Sussan, 1763 Columbia Road NW.,
Washington, D.C. 20009
Filed Aug. 31, 1965, Ser. No. 484,078
6 Claims. (Cl. 126—25)

This invention relates to cookers of compact portable type which can be used for indoor or outdoor cooking, broiling, toasting, etc., on tables or lawns for picnics, for the preparation of exotic dishes, and the like.

An object of the present invention is to provide a cooker adapted to the broiling of meats and meat preparations such as shish kebab on spits, and which alternately may be used for preparing food articles without the use of spit rod or similar means.

Further objects include the provision of a device which is relatively light in weight, convenient to move, of unitary construction, adapted to use solid fuel such as charcoal, and which is economical, versatile and efficient.

Portable compact cooking devices of conventional types usually are provided with a grill element for supporting the food to be cooked. The grills are normally formed of bars or wires, parallel and usually in the form of a wide mesh, and are removable for purposes of cleaning, disposal of ashes, etc. Such grill elements are easily lost or misplaced and further, are not suitable if the cooker is to be used for broiling on spit rods.

In view of these and other shortcomings of presently available cookers of aforesaid type, it is, in accordance with the present invention, a feature thereof, in that no grill element of conventional type is employed; that the emptying and cleaning of the cooker are simplified; that the broiling of shish kebab can be carried out in a particularly effective manner; and on the other hand by a simple operation without use of any adjunct elements the cooker can be adapted to the broiling or roasting of relative larger meat portions such as whole chickens or steaks.

Whereas the invention is particularly pointed out in the subjoined claims, for purposes of rendering the invention and the features thereof readily understood, the following description is provided:

In the drawings:

FIG. 1 is a perspective view of a portable cooker conforming to the present invention.

FIG. 2 is a plan view of the cooker illustrated in FIG. 1.

FIG. 3 is a vertical view of said cooker, and

FIG. 4 is a vertical view partly in section, taken along line 4—4 of FIG. 2.

The cooker illustrated in the drawings consists essentially of an open vessel of generally cylindrical form, composed of a walled portion 10 and a bottom plate 12, assembled into a unitary piece as by welding. The vessel is vertically subdivided by means of a grate member 14 into an upper fuel chamber 16 and a lower ash chamber 18. Grate member 14 is supported with suitably located inwardly extending lugs 20 (a, b, c and d) which are attached to wall 10 by means of rivets 22. Legs 24 (a, b, and c) extend vertically up to the rim of the outside wall, being attached thereto by rivets, and downwardly to a sufficient extent to support the vessel above the ground or table level.

In operation, charcoal or other suitable solid fuel, is placed in fuel chamber 16 wherein it is supported by grate plate 14. During combustion, air enters through perforations 26 in door 32 and circulates through chamber 18 and thence upwardly through perforations 28 in the grate plate, and on through the charcoal bed 30. The rate of combustion and flow of air can be varied by the width of opening of door 32.

Ashes 34 formed during combustion of the charcoal drop through the perforations 28 and collect on bottom plate 12 in the ash pit chamber 18, and therefrom may be removed from time to time through door opening 32.

Handles are provided having heat insulated grips 36 in order to convey the cooker from place to place during combustion of the fuel. The handles in the views illustrated are riveted to wall 10 by means of rivets 22, the latter extending inwardly through said wall and serving also to affix lugs 20 to the inner surface of wall 10. Legs 24 likewise are attached to wall 10 by means of rivets.

Near the top edge or rim of wall 10 a peripheral row of openings 38 are arranged. These open above the normal height of the fuel bed. These openings serve in part in the superficial circulation of air, but more particularly have a function which is hereinafter explained.

Referring to FIG. 1, there is illustrated a spit rod provided at one end with a handle 40 and at the other end 42 a point. This spit rod may, of course, be of any conventional design. The elevation of the rod and of the food impaled thereon above the surface of the fuel bed may be varied by utilizing openings 38. For example, in the position shown in FIG. 1, one end of spit rod 40 rests upon rim 44 of wall 10, and the other end rests within opening 38. In this position the food impaled on the rod is closer to the fuel bed than when the rod is simply laid on the upper rim of the wall. For simplicity the latter position of rod 40 is not illustrated. Also some further latitude governing the distance of the article of food from the glowing coals is provided by sliding the rod to the right or left, which will raise or lower the article to some degree.

When, on the other hand, it is desired to broil a comparatively large food article, such as a chicken or steak, the cooker may be operated as follows:

Referring to FIG. 1, there are shown, in inwardly extended position, three support members 46 (a, b and c) hingedly affixed substantially at the top rim 44. These support members are mounted to swing from a level inwardly extending position as shown, to a substantially vertical position, out and away from the fuel bed as shown in FIG. 4. The support members thus may traverse an arc of about 270 degrees, or, as will be readily apparent, the supports need only be rotated through an angle of slightly more than 90 degrees in order to remain at rest, although a lower or pendant position probably will be found more convenient. Whereas the spit rod may be used while the supports are in the position shown in FIGS. 1, 2 and 4, they usually will be swung out of position when the spit method of broiling is used.

The hinge connection best shown in FIG. 4 consists of a bent over portion 48 of each leg 24 forming a bearing member, through which passes a part of support member 46 which part thus constitutes a pintle or pivot member 50.

One simple way to insure that the support members when inwardly swung will rest over the fuel bed in a substantially horizontal position, is to locate hinge means 48 in such a way, best shown n FIGS. 3 and 4, as to position the axis of rotation just outside and slightly higher than the rim line 44 of the vessel wall. Whereas the support members 46 may be in various shapes and sizes, it is desirable that they should be of such proportion as to extend only part way across the fuel chamber and over the fire bed.

It will be understood that the present invention in its broader aspects is not limited to the specific details of construction above set forth.

I claim:

1. A portable cooker comprising a vessel open at the top, said vessel having a continuous vertical wall and being subdivided into an upper fuel chamber having an upper peripheral rim, and a lower ash chamber, said chambers being separated by a grate member, leg members supporting said vessel and formed of straps extending vertically along the side of said vessel and being rolled outwardly at the top to form pivot-receiving openings near said rim, support members pivoted in said pivot-receiving openings, each support member being rotatable about its pivot axis to extend inwardly and over said fuel chamber when in use, and optionally to fold out to a position substantially vertical and parallel to the wall of said vessel when not in use, said cooker being further provided with spit supporting means located below the rim of said fuel chamber.

2. A portable cooker according to claim 1 wherein said fuel chamber is provided with a row of openings in the periphery thereof below said rim.

3. A portable cooker according to claim 1 wherein said pivoted support members are rotatable through an angle of at least 270 degrees.

4. A portable cooker according to claim 1 wherein said pivot-receiving openings are outside and slightly higher than said rim.

5. A portable cooker according to claim 1 wherein said support members when in inwardly extended position rest in a substantially horizontal position.

6. A portable cooker according to claim 1 wherein each of said support members is of a length sufficient only to extend part way across said fuel chamber.

References Cited

UNITED STATES PATENTS

| 1,991,135 | 2/1935 | Brown | 126—38 |
| 2,744,809 | 5/1956 | Falligant. | |
| 2,917,039 | 12/1959 | Sheedlo | 126—9 |

FOREIGN PATENTS 255,898    2/1949    Switzerland.

FREDERICK KETTERER, *Primary Examiner.*